US010323665B2

(12) United States Patent
Potts et al.

(10) Patent No.: US 10,323,665 B2
(45) Date of Patent: Jun. 18, 2019

(54) FLOW MODIFICATION DEVICE, SYSTEM, AND METHOD

(71) Applicant: AMOG Technologies Pty Ltd, Notting Hill, Victoria (AU)

(72) Inventors: Andrew Elmhirst Potts, North Balwyn (AU); Hayden Marcollo, Box Hill North (AU)

(73) Assignee: AMOG TECHNOLOGIES PTY LTD, Notting Hill, Victoria (AU)

(*) Notice: Subject to any disclaimer, the term of this patent is extended or adjusted under 35 U.S.C. 154(b) by 0 days.

(21) Appl. No.: 15/738,816

(22) PCT Filed: Jun. 27, 2016

(86) PCT No.: PCT/AU2016/050550
§ 371 (c)(1),
(2) Date: Dec. 21, 2017

(87) PCT Pub. No.: WO2016/205898
PCT Pub. Date: Dec. 29, 2016

(65) Prior Publication Data
US 2018/0180073 A1 Jun. 28, 2018

(30) Foreign Application Priority Data
Jun. 26, 2015 (AU) ................................ 2015902488
Sep. 23, 2015 (AU) ................................ 2015903879

(51) Int. Cl.
E21B 17/01 (2006.01)
F15D 1/12 (2006.01)
(Continued)

(52) U.S. Cl.
CPC .............. F15D 1/12 (2013.01); E21B 17/012 (2013.01); F15D 1/10 (2013.01); F16L 1/123 (2013.01);
(Continued)

(58) Field of Classification Search
CPC .... F15D 1/10; F15D 1/12; F16L 1/123; E21B 17/012; B63B 21/20; B63B 21/502; B63B 2021/203; B63B 2021/504
See application file for complete search history.

(56) References Cited

U.S. PATENT DOCUMENTS 4,422,801 A * 12/1983 Hale ..................... E21B 17/012
166/350
6,223,372 B1 5/2001 Barber
(Continued)

FOREIGN PATENT DOCUMENTS

DE 3609541 A1 9/1987
FR 2367148 A1 5/1978
(Continued)

OTHER PUBLICATIONS

International Search Report and Written Opinion issued for International application No. PCT/AU2016/050550, dated Oct. 7, 2016, 10 pages.

Primary Examiner — Benjamin F Fiorello
(74) Attorney, Agent, or Firm — Duane Morris LLP

(57) ABSTRACT

A flow modification device connectable to a generally cylindrical element adapted for immersion in a fluid medium, the device comprising an elongate body having a length and a generally circular cross-section; a plurality of raised body portions disposed about and extending along the length of the elongate body, the raised body portions being arranged generally parallel to a longitudinal axis of the body and having a height between 2% and 10% of a diameter of the body; and an aperture extending through the length of the elongate body, the aperture being adapted to receive the generally cylindrical element such that the flow modification device is arranged about the cylindrical element. The plurality of raised body portions are adapted to reduce vortex-induced vibration and/or drag on the cylindrical element (Continued)

when the device is connected to the cylindrical element and the connected device and cylindrical element are immersed in the fluid medium and there is relative movement between the connected device and cylindrical element and the fluid medium.

11 Claims, 13 Drawing Sheets

(51) Int. Cl.
    *F16L 1/12*     (2006.01)
    *F15D 1/10*     (2006.01)
    *B63B 21/20*     (2006.01)
    *B63B 21/50*     (2006.01)
    *B63B 21/66*     (2006.01)

(52) U.S. Cl.
    CPC ............. *B63B 21/20* (2013.01); *B63B 21/502* (2013.01); *B63B 21/66* (2013.01); *B63B 2021/203* (2013.01); *B63B 2021/504* (2013.01)

(56) References Cited

U.S. PATENT DOCUMENTS

| | | | |
|---|---|---|---|
| 6,896,447 B1 | 5/2005 | Taqino | |
| 7,513,209 B2 | 4/2009 | Masters et al. | |
| 8,443,896 B2 * | 5/2013 | Howard | E21B 17/012 166/345 |
| 8,944,722 B1 * | 2/2015 | Allen | E02B 17/0017 405/216 |
| 2002/0168232 A1 * | 11/2002 | Xu | E21B 17/01 405/224 |
| 2007/0231077 A1 * | 10/2007 | Burgess | B63B 21/502 405/216 |
| 2008/0131210 A1 * | 6/2008 | Wajnikonis | B63B 21/502 405/211 |
| 2009/0185867 A1 * | 7/2009 | Masters | F16L 1/123 405/216 |
| 2009/0185868 A1 * | 7/2009 | Masters | B29C 45/14311 405/216 |
| 2009/0252559 A1 * | 10/2009 | Masters | B63C 11/52 405/195.1 |
| 2010/0215440 A1 * | 8/2010 | Wajnikonis | B63B 22/18 405/211 |
| 2013/0330131 A1 * | 12/2013 | Meijer | B63B 21/663 405/184.2 |
| 2015/0086276 A1 * | 3/2015 | Harbison | F15D 1/12 405/216 |

FOREIGN PATENT DOCUMENTS

| | | |
|---|---|---|
| GB | 2335248 B | 12/2002 |
| WO | 2002/095278 A1 | 11/2002 |
| WO | 2009/035481 A1 | 3/2009 |

* cited by examiner

FLOW MODIFICATION DEVICE, SYSTEM, AND METHOD

CROSS-REFERENCE TO RELATED PATENT APPLICATIONS

The present application is a U.S. national stage application under 35 U.S.C. § 371 of PCT Application No. PCT/AU2016/050550, filed Jun. 27, 2016, which claims priority to Australian patent application no. 2015902488, filed Jun. 26, 2015, and Australian patent application no. 2015903879, filed Sep. 23, 2015, the entireties of which are incorporated herein by reference.

FIELD OF THE INVENTION

The present invention relates to devices, systems and methods for reducing vortex-induced vibration (VIV) and/or overall drag on a generally cylindrical or tubular element immersed in a fluid medium. The invention is particularly suited to reducing VIV and drag on marine structures such as risers, umbilicals, cables, and pipelines.

BACKGROUND OF THE INVENTION

Cylindrical structures such as marine risers, umbilicals, cables, and pipelines will generally be subject to vortex-induced vibration excitation when immersed in a flowing fluid medium, or when moving relative to the fluid medium. This dynamic excitation can result in an amplified drag force and a decreased operating life due to fatigue.

In the offshore industry, cylindrical structures are used in production and drilling risers, pipelines near the seabed, seawater intakes, discharge lines, and many other similar structures. Generally, these cylindrical structures will be subject to VIV, which can be more problematic with greater flow/current speed and longer cylinder lengths.

Flow modification devices have been developed to reduce the level or severity of VIV on cylindrical structures. These flow modification devices aim to prevent coherent vortices from shedding about the cylindrical structure. U.S. Pat. No. 8,443,896 describes a flow modification device, in the form of a plurality of helical strakes, connectable to a marine riser. Helical strakes may reduce the severity of VIV to very small levels, but are generally large and not practical to handle. For example, drilling risers involve deployment, retrieval, and stacking operations which are not easily achieved with large helical strake devices.

U.S. Pat. Nos. 7,513,209 and 6,223,672 describe rigid fairing devices connectable to marine risers. Rigid fairings aim to suppress VIV by streamlining and delaying separation of the flow about the cylindrical structure. Rigid fairings are typically unidirectional devices and generally involve clamping the fairing to the cylindrical structure. The clamping process can be time consuming, which is disadvantageous in light of expensive production and operating schedules, for example, when undertaking drilling operations.

Vortex shedding about cylindrical structures is generally described in *Flow-Induced Vibrations: An Engineering Guide* (2005) by Naudacher, E. and Rockwell, D. from Dover Publications, which is incorporated herein by reference. Further flow modification devices and/or methods are disclosed in the following patent publications: FR 2367148, WO 2002/095278, and WO 2009/035481.

It is an object of the present invention to provide flow modification devices, systems, and methods which overcome, or at least ameliorate, one or more deficiencies of the prior art, or at least provides a useful alternative.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect, the present invention provides a flow modification device connectable to a generally cylindrical element adapted for immersion in a fluid medium, the device comprising:

an elongate body having a length and a generally circular cross-section;

a plurality of raised body portions disposed about and extending along the length of the elongate body, the raised body portions being arranged generally parallel to a longitudinal axis of the body and having a height between 2% and 10% of a diameter of the body; and an aperture extending through the length of the elongate body, the aperture being adapted to receive the generally cylindrical element such that the flow modification device is arranged about the cylindrical element;

wherein the plurality of raised body portions are adapted to reduce vortex-induced vibration and/or drag on the cylindrical element when the device is connected to the cylindrical element and the connected device and cylindrical element are immersed in the fluid medium and there is relative movement between the connected device and cylindrical element and the fluid medium.

The plurality of raised body portions are preferably not continuous along the entire length of the elongate body. For example, in one embodiment, there may be a first plurality of raised body portions disposed along a first length of the elongate body, and there may be a second plurality of raised body portions disposed along an adjacent second length of the elongate body. In this embodiment, the second plurality of raised body portions may be off-set about the longitudinal axis with respect to the first plurality of raised body portions such that the second plurality of raised body portions are not aligned with the first plurality of raised body portions. In one particularly preferred embodiment, the second plurality of raised body portions are longitudinally off-set or rotated about the longitudinal axis with respect to the first plurality of raised body portions by a rotation angle, which rotation angle is preferably approximately half the angle between adjacent raised body portions of the first plurality of raised body portions (as measured from centrelines of adjacent raised body portions). The flow modification device may also include one or more additional pluralities of raised body portions disposed along one or more additional respective lengths of the elongate body, and each of the one or more additional pluralities of raised body portions may be longitudinally off-set or rotated about the longitudinal axis with respect to an adjacent plurality of raised body portions disposed along an adjacent length of the elongate body. Hence the elongate body may include 2, 3, 4 or more lengths of raised body portions in which each length of raised body portion is longitudinally offset or rotated about the longitudinal axis with respect to an adjacent length of raised body portion.

In one embodiment, the plurality of raised body portions (or strakes) are generally curved or rounded ridges and preferably have a radii between 2% and 38% of an outer diameter of the body. In this embodiment, the elongate body preferably includes 4 or more or 5 or more curved or rounded ridges disposed equidistant about the elongate body. More preferably, the elongate body includes 12 or less or 9 or less curved or rounded ridges disposed equidistant about the elongate body. Still more preferably, the elongate body includes an odd number of curved or rounded ridges, such as 5, 7, or 9 curved or rounded ridges disposed equidistant about the elongate body. It has been discovered that an odd number of curved or rounded ridges results in a lower amplitude of vibration of the generally cylindrical element (as compared to an adjacent even number of curved or rounded ridges). In an alternative arrangement, the curved or rounded ridges may be disposed in a manner about the elongate body such that adjacent curved or rounded ridges are not equidistant from one another. In a further alternative arrangement, adjacent curved or rounded ridges may have a differing height.

As used throughout this specification, the terms "generally curved or rounded ridges", "curved raised body portions", "curved strakes" or any similar variations define any suitably curved or curve-like raised body portion geometry, or any substantially continuous geometry having no definite corners. For example, in one embodiment, the raised body portions may be generally parabolic in shape.

Optionally, the curved or rounded ridges define respective grooved body portions therebetween. In one embodiment, the respective grooved body portions are generally concave and have a generally curved shape. In this embodiment, the generally curved grooved body portions preferably have radii between 0.75% and 78% of the diameter of the body. In an alternative embodiment, the grooved body portions may be generally convex (or outwardly directed) and may have a generally curved shape (or the grooved body portions may adopt the primary or base shape of the generally circular elongate body, or be concentric thereto).

In an alternative embodiment, the plurality of raised body portions (or strakes) are generally trapezoidal ridges. The trapezoidal ridges may have either chamfered or radiused corners and preferably have widths between 3% and 7% of the outer diameter of the body, but more preferably about 3% of the outer diameter. In this embodiment, the elongate body preferably includes between 3 and 16 trapezoidal ridges (or strakes) disposed equidistant about the elongate body. In one arrangement, the elongate body may include a relatively low number of trapezoidal ridges disposed equidistant about the elongate body (for example 3, 4, or 5 trapezoidal ridges). In an alternative arrangement, the elongate body may include a relatively high number of trapezoidal ridges disposed equidistant about the elongate body (for example 12, 14, or 16 trapezoidal ridges). In an alternative arrangement, the trapezoidal ridges may be disposed in a manner about the elongate body such that adjacent trapezoidal ridges are not equidistant from one another. In a further alternative arrangement, adjacent trapezoidal ridges may have a differing height.

In this embodiment, the generally trapezoidal ridges may optionally define respective grooved body portions therebetween. In one embodiment, the respective grooved body portions have an outwardly directed generally curved (or convex) shape (or the grooved body portions may adopt the primary or base shape of the generally circular elongate body, or be concentric thereto). In these embodiments, the generally curved grooved body portions preferably have radii between 0.75% and 78% of the diameter of the body.

In an alternative embodiment, the respective grooved body portions may be generally concave and have a generally curved shape.

The flow modification device may comprise at least two releasably connectable complementary parts, such as a first part and a second part. In a preferred embodiment, the flow modification device is divided about its longitudinal axis to define the first and second parts. In this embodiment, the first part may be a first half of the flow modification device, and the second part may be a second half of the flow modification device. Advantageously, in this embodiment, the first and second parts may be releasably connectable, for example by a clamping means, so as to releasably secure the flow modification device about the cylindrical element.

In an embodiment, the generally cylindrical element is a continuous rubber or metal extrusion. In an alternative embodiment, the cylindrical element is a composite winding. In a still further alternative embodiment, the cylindrical element is a continuous reinforced concrete element. The cylindrical element may be a marine riser, cable, umbilical, tubular member, or other similar structural element.

Advantageously, the flow modification device may be externally fitted, for example by sliding or clamping, to any type of generally cylindrical or tubular structure immersed in a fluid. Such structures include, by way of example only, chimneys, cables, drilling risers and their buoyancy elements, moorings, risers and umbilicals on fixed platforms, riser and umbilical distributed buoyancy elements (the buoys themselves) such as lazy wave risers, seawater intakes, semisubmersible legs and bracing members, spars, and subsea systems including rigid seabed spools. The present flow modification device is particularly suited for connection to buoyancy elements. Buoyancy elements typically comprise syntactic foam with rigid outer shells, and are designed to withstand large hydrostatic crushing pressures at great sea depths. Their displacement provides buoyancy to the structural element that they are connected to. In an embodiment, the present flow modification device may be fabricated such that it has the abovementioned features of typical buoyancy elements.

Advantageously, the flow modification device reduces VIV and drag on the cylindrical element when the flow modification device (or a plurality of flow modification devices) are arranged about and releasably secured to the cylindrical element.

In a second aspect, the present invention provides a flow modification system for the reduction of vortex-induced vibration and/or drag on a generally cylindrical element immersed in a fluid medium, the system comprising:

a plurality of flow modification devices according to the first aspect of the invention, wherein each flow modification device is arranged about and extends along the cylindrical element; and a means for releasably securing each of the plurality of flow modification devices about the cylindrical element.

Preferably, the means for releasably securing a flow modification device about the cylindrical element comprises an elongate strap. The elongate strap may be receivable about the elongate body of the flow modification device. The elongate strap may include recessed tensioners or internal bolted fasteners that act to tighten the elongate strap about the flow modification device (and therefore the cylindrical element).

In an embodiment, the plurality of raised body portions of a first flow modification device may be aligned with the immediately adjacent plurality of raised body portions of a second adjacent flow modification device. In an alternative arrangement, the raised body portions of the first flow modification device may not be aligned with the immediately adjacent plurality of raised body portions of the second adjacent flow modification device. In this arrangement, the raised body portions of the first flow modification device may be longitudinally off-set or rotated about the longitudinal axis with respect to the immediately adjacent raised body portions of the second adjacent flow modification device by a rotation angle, which rotation angle is preferably half the angle between adjacent raised body portions of the first flow modification device (as measured from centrelines of adjacent raised body portions). Accordingly, each flow modification device of the plurality of flow modification devices arranged about the cylindrical element may be longitudinally off-set or rotated with respect to an adjacent flow modification device. Alternatively, groups of one or more flow modification devices may be longitudinally off-set or rotated with respect to an adjacent group of one or more flow modification devices. As is described in relation to the first aspect of the invention, the flow modification device of these embodiments may include one or more additional adjacent pluralities of raised body portions that are longitudinally off-set or rotated with respect to one another in the manner described above.

In a third aspect of the invention, there is provided a method for reducing vortex-induced vibration and/or drag on a generally cylindrical element immersed in a fluid medium, the method comprising the steps of:

arranging a plurality of flow modification devices according to the first aspect of the invention about the cylindrical element, and releasably securing each of the plurality of flow modification devices to the cylindrical element.

Preferably, the means for releasably securing a flow modification device about the cylindrical element comprises an elongate strap. The elongate strap may be receivable about the elongate body of the flow modification device.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 8 shows the total drag under freely vibrating conditions;

DETAILED DESCRIPTION OF THE EMBODIMENTS

Figure 1:
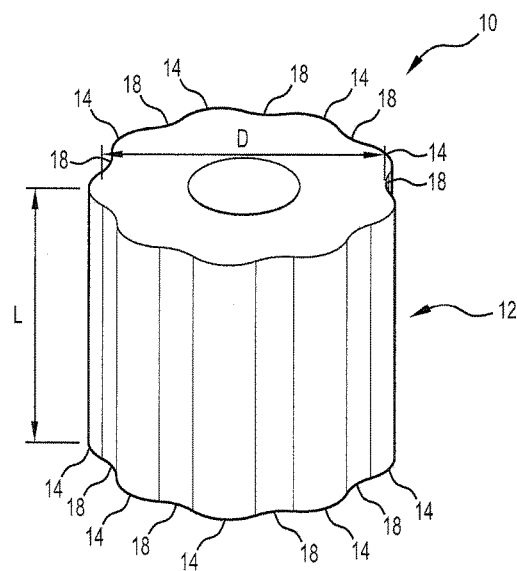
FIG. 1 is a perspective view of a flow modification device according to an embodiment of the invention.

Referring to FIG. 1, there is shown a flow modification device 10 connectable to a generally cylindrical element (not shown) immersed in a fluid medium such as water or air. The generally cylindrical element may be a marine riser, cable, umbilical, or other similar tubular member.

The flow modification device 10 provides vortex-induced vibration (VIV) suppression and drag reduction advantages due to the cross-sectional shape of the device 10. The cross-sectional shape of the device 10 alters the way in which vortices are formed as compared to typical substantially circular cross-sections, as described below in relation to FIG. 9.

The flow modification device 10 may be connected to or installed on an existing cylindrical element. Alternatively, a cylindrical element may be manufactured such its cross-section includes the features of the flow modification device 10. In other words, the flow modification device 10 of FIG. 1 may be a cylindrical element, such as a marine riser, cable, umbilical, or other tubular member, and not a separate device connectable to a cylindrical element. As such, throughout this description, a reference to the features of the flow modification device 10 also applies to a cylindrical element incorporating such features. Advantageously, by manufacturing a cylindrical element having the described cross-section, a separate flow modification device 10 is not required to be installed about the cylindrical element. Rather, the cylindrical element will include all the necessary structural features to suppress or reduce VIV and drag according to the invention.

In the embodiment of FIG. 1, the flow modification device 10 includes an elongate body 12 having a length L and a generally circular cross-section. The device 10 also includes a plurality of raised body portions (or strakes) in the form of generally curved or rounded ridges 14 disposed about and extending along the length L of the elongate body 12. The curved or rounded ridges 14 are arranged generally parallel to a longitudinal axis of the elongate body 12 and have a height between 2% and 10% of an outer diameter D of the body 12, but more preferably between 2% and 7.5% of the outer diameter D. The diameter D is the diameter of a circle drawn through the outermost edges of the raised body portions (or strakes). In other words, a circle intersecting the outermost edges of the raised body portions would have the diameter D.

The flow modification device 10 also includes an aperture 16 extending through the length L of the elongate body 12. The aperture 16 is appropriately sized and dimensioned so as to receive the generally cylindrical element (not shown) such that the flow modification device 10 is arranged about the cylindrical element. The plurality of raised body portions or curved or rounded ridges 14 are adapted to reduce vortex-induced vibration and drag on the cylindrical element when the device 10 is connected to the cylindrical element, and when the connected device 10 and cylindrical element are immersed in the fluid medium and there is relative movement between the connected device and cylindrical element and the fluid medium.

As shown in FIG. 1, the plurality of curved or rounded ridges 14 define respective grooved body portions 18 therebetween. The grooved body portions 18 are generally concave and have a generally inverted or inwardly directed curved shape (as compared to the outwardly directed curved shape of the raised body portions or ridges 14). Alternatively, the grooved body portions 18 may adopt the primary or base shape of the generally circular elongate body 12 (as is shown particularly in FIG. 4).

Figure 2:
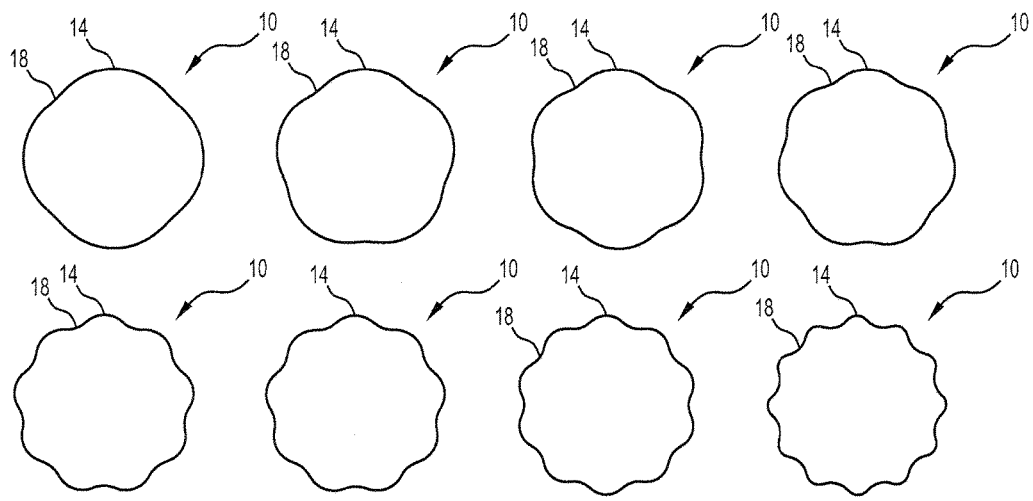
FIG. 2 is a cross-sectional view of alternative flow modification devices according to various alternative embodiments of the invention.

Referring to FIG. 2, there is shown several cross-sectional views of alternative embodiments of the flow modification device 10. In one embodiment, the flow modification device 10 includes four generally curved or rounded ridges 14 disposed equidistant about the elongate body (shown top-left). In alternative embodiments, the flow modification device 10 includes either five, six, seven, eight, nine, eleven, or twelve curved or rounded ridges 14 (shown top-left to bottom-right respectively). The number and relative size of the curved or rounded ridges 14 has an effect on the amplitude of vibration and the coefficient of drag of the cylindrical element, as is described below. The grooved body portions 18 disposed intermediate to adjacent curved or rounded ridges 14 preferably have radii between 0.75% and 78% of the diameter of the elongate body 12, as is described below.

Figure 3:
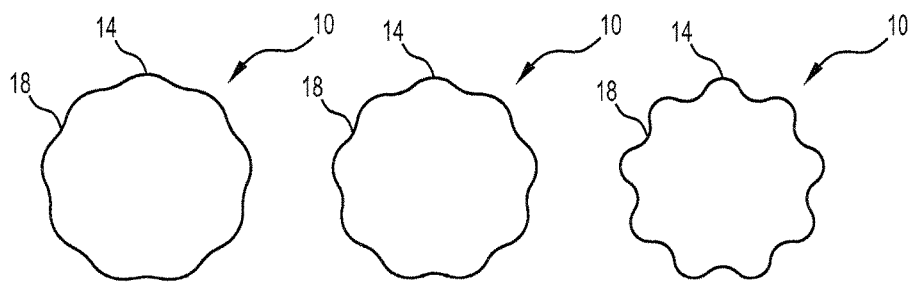
FIG. 3 is similar to FIG. 2.

FIG. 3 shows further alternative embodiments of the flow modification device 10. In these embodiments, the flow modification device 10 includes nine curved or rounded ridges 14 disposed equidistant about the elongate body. In one embodiment (illustrated on the far-left), the height of the curved or rounded ridges 14 is 2% of the diameter of the body 12. In the other illustrated embodiments, the height of the curved or rounded ridges 14 is 3.8% or 7.1% of the diameter (shown left to right respectively).

Figure 4:
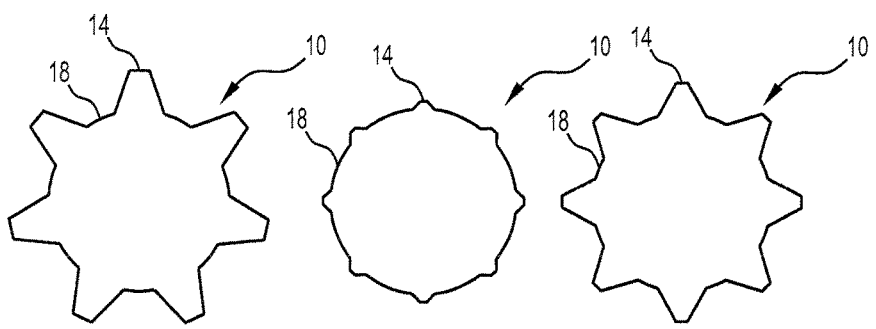
FIG. 4 is similar to FIGS. 2 and 3.
Figure 4:
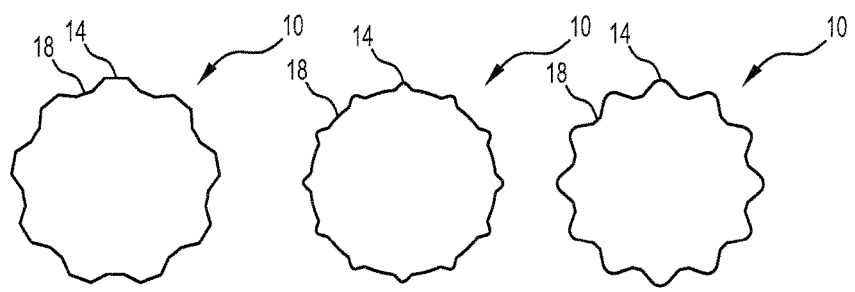

FIG. 4 shows further alternative embodiments of the flow modification device 10 in which the plurality of raised body portions (or strakes) 14 are generally trapezoidal ridges. In these embodiments, the elongate body preferably includes between 3 and 16 trapezoidal ridges disposed equidistant about the elongate body. In one particularly preferred embodiment, the flow modification device 10 includes seven generally trapezoidal ridges 14 disposed equidistant about the elongate body (shown top-left). In the other illustrated embodiments, the flow modification device 10 includes either eight, nine, or twelve trapezoidal ridges 14 (shown top-left to bottom-right respectively). In these embodiments, the trapezoidal ridges have either chamfered or radiused corners and preferably have widths between 3% and 7% of the outer diameter of the body, but more preferably about 3% of the outer diameter.

As shown in FIG. 4, the generally trapezoidal ridges 14 define respective grooved body portions 18 therebetween. The respective grooved body portions 18 have an outwardly directed generally curved (or convex) shape (or, in other words, the grooved body portions adopt the primary or base shape of the generally circular elongate body). In the embodiments illustrated, the generally curved grooved body portions 18 preferably have radii between 0.75% and 78% of the diameter of the body.

Figure 1A:
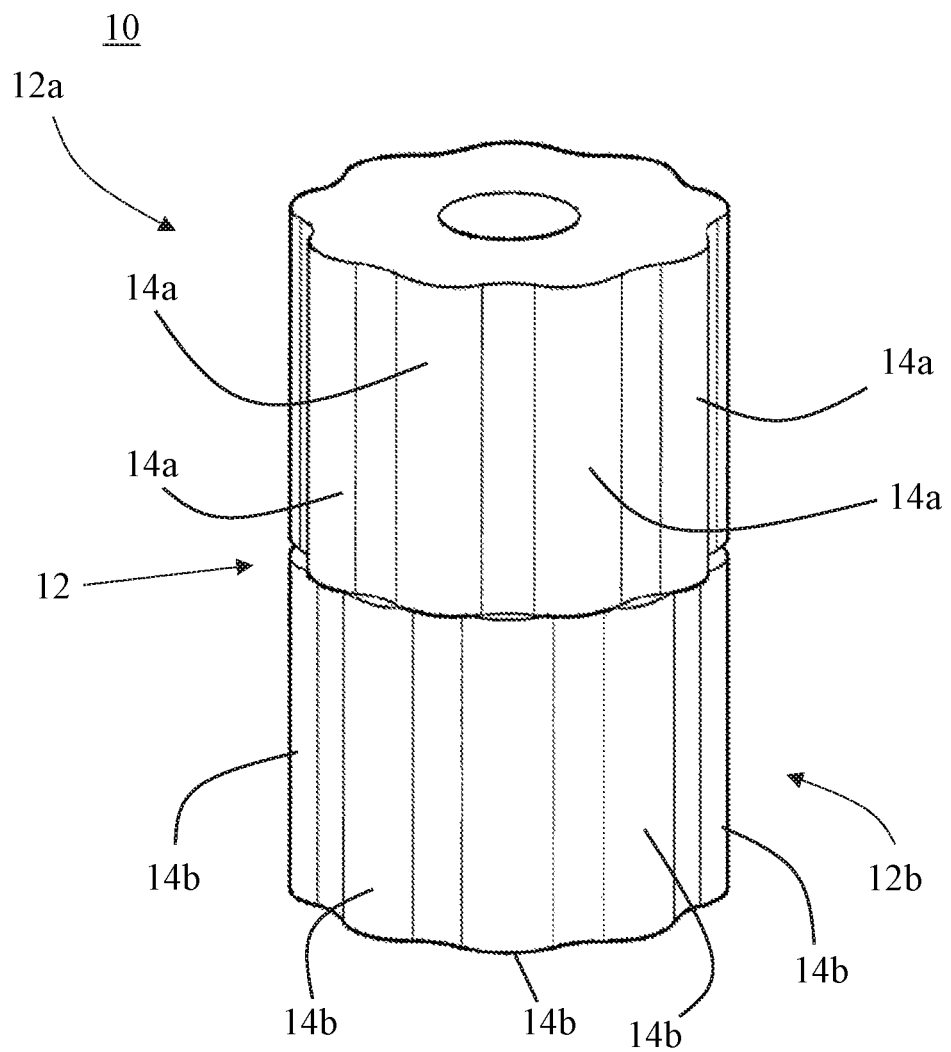
FIG. 1A is a perspective view of a flow modification device according to one embodiment in which a first set of raised body portions are off-set about the longitudinal axis with respect to a second set of raised body portions.

As shown in FIG. 1A, the plurality of raised body portions (e.g., the curved/rounded ridges or the trapezoidal ridges) may not be continuous along the entire length of the elongate body. For example, in one embodiment, shown in FIG. 1A, there may be a first plurality of raised body portions 14a disposed along a first length 12a of the elongate body 12, and there may be a second plurality of raised body portions 14b disposed along an adjacent second length 12b of the elongate body 12. In this embodiment, the second plurality of raised body portions 14b may be off-set about the longitudinal axis with respect to the first plurality of raised body portions 14a such that the second plurality of raised body portions 14b are not aligned with the first plurality of raised body portions 14a. In one particularly preferred embodiment, the second plurality of raised body portions 14b are longitudinally off-set or rotated about the longitudinal axis with respect to the first plurality of raised body portions 14a by a rotation angle, which rotation angle is preferably approximately half the angle between adjacent raised body portions of the first plurality of raised body portions 14a (as measured from centrelines of adjacent raised body portions). The flow modification device 10 may also include one or more additional pluralities of raised body portions (not shown) disposed along one or more additional respective lengths of the elongate body 12, and each of the one or more additional pluralities of raised body portions may be longitudinally off-set or rotated about the longitudinal axis with respect to an adjacent plurality of raised body portions disposed along an adjacent length of the elongate body 12.

Figure 5:
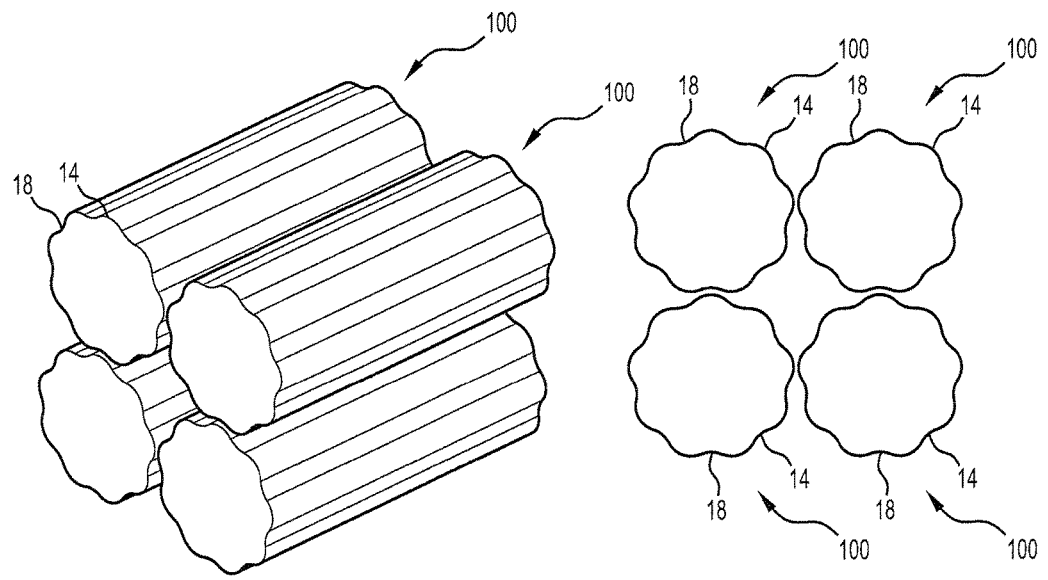
FIG. 5 is a perspective view of a plurality of generally cylindrical elements according to an embodiment of the invention.

Advantageously, as shown in FIG. 5, a plurality of cylindrical elements 100 incorporating some of the above described features of the flow modification device 10 are stackable, for example, on a deck of a drilling rig. As shown in FIG. 5, the generally curved or rounded ridges 14 of a lowermost cylindrical element are substantially seated or received within the grooved body portions 18 of an uppermost cylindrical element, thereby allowing the lowermost and uppermost cylindrical elements to be stacked. In this sense, the generally curved or rounded ridges 14 act a male "locking" feature to the complementary female grooved body portions 18. Such storage and stacking advantages are not apparent in certain prior VIV suppression devices such as those incorporating helical strakes. Furthermore, VIV devices incorporating helical strakes generally suffer damage when stacked due to point loading on their sharp raised edges.

As described previously, the flow modification device 10 may be manufactured as a buoyancy element. In this embodiment, an outer shell comprising fibreglass or polyethylene is initially constructed. The outer shell may be moulded such that it has the above described cross-sectional features. Closed-cell foam, such as syntactic foam may then be injected or set within the outer shell. The syntactic foam may consist of macro-spheres and/or micro-spheres and/or resin depending upon the application and water depth being designed for. The required material will be apparent to those skilled in the relevant art. In an alternative embodiment, the flow modification device 10 may be entirely machined out of closed-cell or syntactic foam. In this embodiment, a separate outer shell is not required to be constructed.

Several tests were conducted to assess the effectiveness of different embodiments of the above described flow modification device 10 or cylindrical element 100. The tests were performed in a water channel having a flow with a Reynolds number between 2,000 and 10,000, and with a spring mounted rigid cylinder having alternating or longitudinally off-set adjacent pluralities of raised body portions and being constrained to vibrate in the cross-flow direction only. The cylinder had an immersed depth of 0.6 m and a diameter of 40 mm. Instrumentation consisted of a linear variable differential transformer (LVDT) for determining displacement time history, and strain gauges for determining inline (drag) and cross-flow force time histories.

Figure 6:
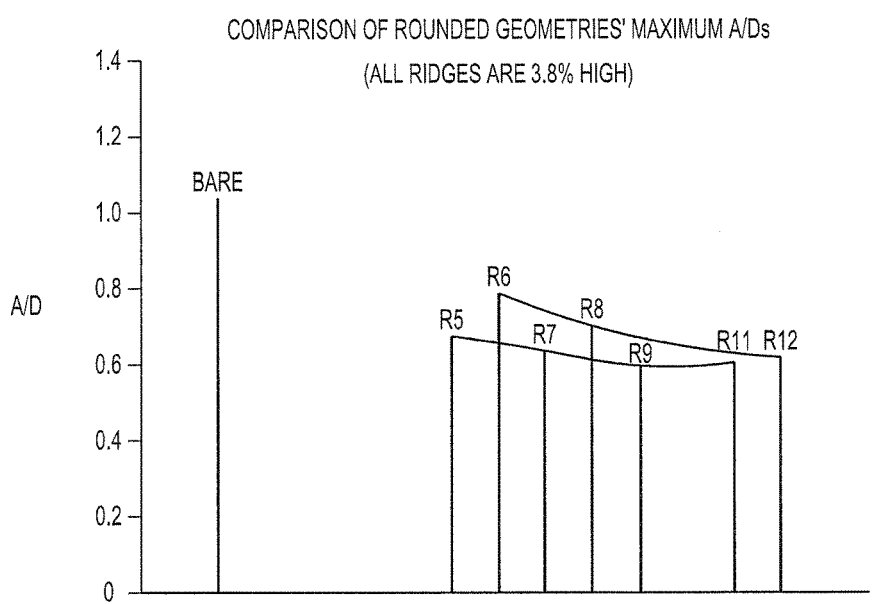
FIG. 6 is a plot of the vibration characteristics of various flow modification devices or cylindrical elements according to embodiments of the invention.

The amplitude of vibration of various cylindrical elements incorporating generally curved or rounded ridges according to an embodiment of the invention is plotted against a bare cylinder (i.e. a cylinder having a standard circular cross-section) in FIG. 6. The values referred to as R5 to R12 on the x-axis refer to the number of curved or rounded ridges 14 disposed about the elongate cylindrical body 12. For example, R5 refers to a cylindrical element incorporating five curved or rounded ridges 14, whereas R12 refers to a cylindrical element incorporating twelve curved or rounded ridges 14. The amplitude of vibration is represented on the y-axis by the non-dimensional quantity A/D and is the mean of the maximum amplitude of vibration for a series of steady state tests. As can be seen in FIG. 6, a cylindrical element incorporating nine curved or rounded ridges 14 exhibited the lowest amplitude of vibration compared to the other tested cylindrical elements. In every case, the flow modification device 10 or cylindrical element 100 exhibited a lower amplitude of vibration as compared to the bare cylinder.

Figure 7:
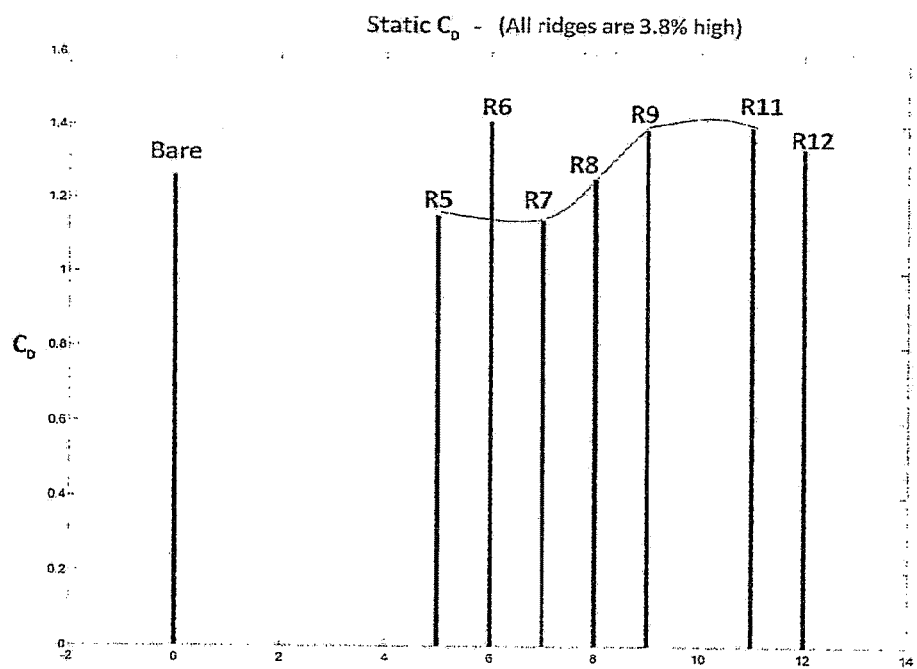
FIG. 7 is a plot of the static drag characteristics of various flow modification devices or cylindrical elements having generally curved or rounded ridges according to embodiments of the invention.

FIG. 7 details the static drag performance of the various cylindrical elements 10. The static drag is represented by the drag coefficient $C_D$, which is plotted on the y-axis. The various geometries (i.e. R5 to R12) are plotted on the x-axis. The drag coefficient $C_D$ is a non-dimensional quantity that is used to quantify the drag or resistance of an object in a fluid medium. A lower drag coefficient indicates that an object will have lower total drag as compared to an object having a higher drag coefficient. As can be seen in FIG. 7, embodiments of the flow modification device 10 or cylindrical element 100 incorporating five, seven, or eight curved or rounded ridges 14 realise the greatest static drag benefits.

Figure 8:
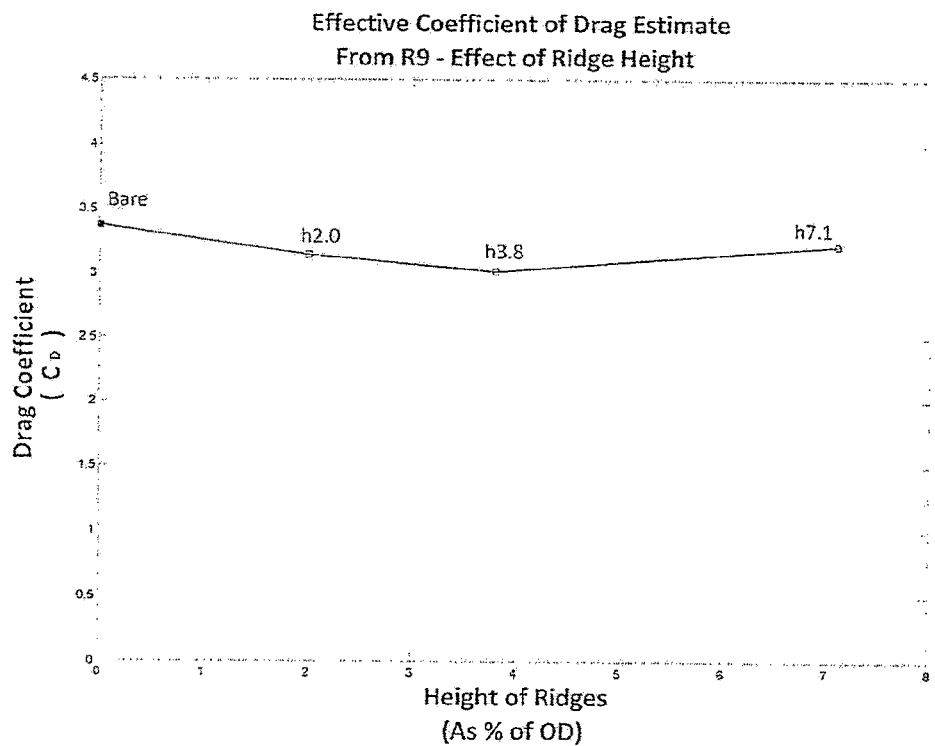
FIG. 8 is similar to FIG. 7, except

FIG. 8 details the total performance drag under freely vibrating conditions of the R9 cylinder, i.e. the cylindrical element incorporating nine curved or rounded ridges 14, having a height of 2.0%, 3.8%, or 7.1% of the diameter (referred to as 'OD' in FIG. 8) of the body 12. As can be seen from FIG. 8, a preferred embodiment of the flow modification device 10 having nine curved or rounded ridges 14 and a ridge height of approximately 3.8% yields the lowest total dynamic drag coefficient of the results plotted in FIG. 8. From this, it could be inferred that a height of less than 4%, or 3.8% or less, is preferred. The lower preferred height is 2% or more.

Figure 9:
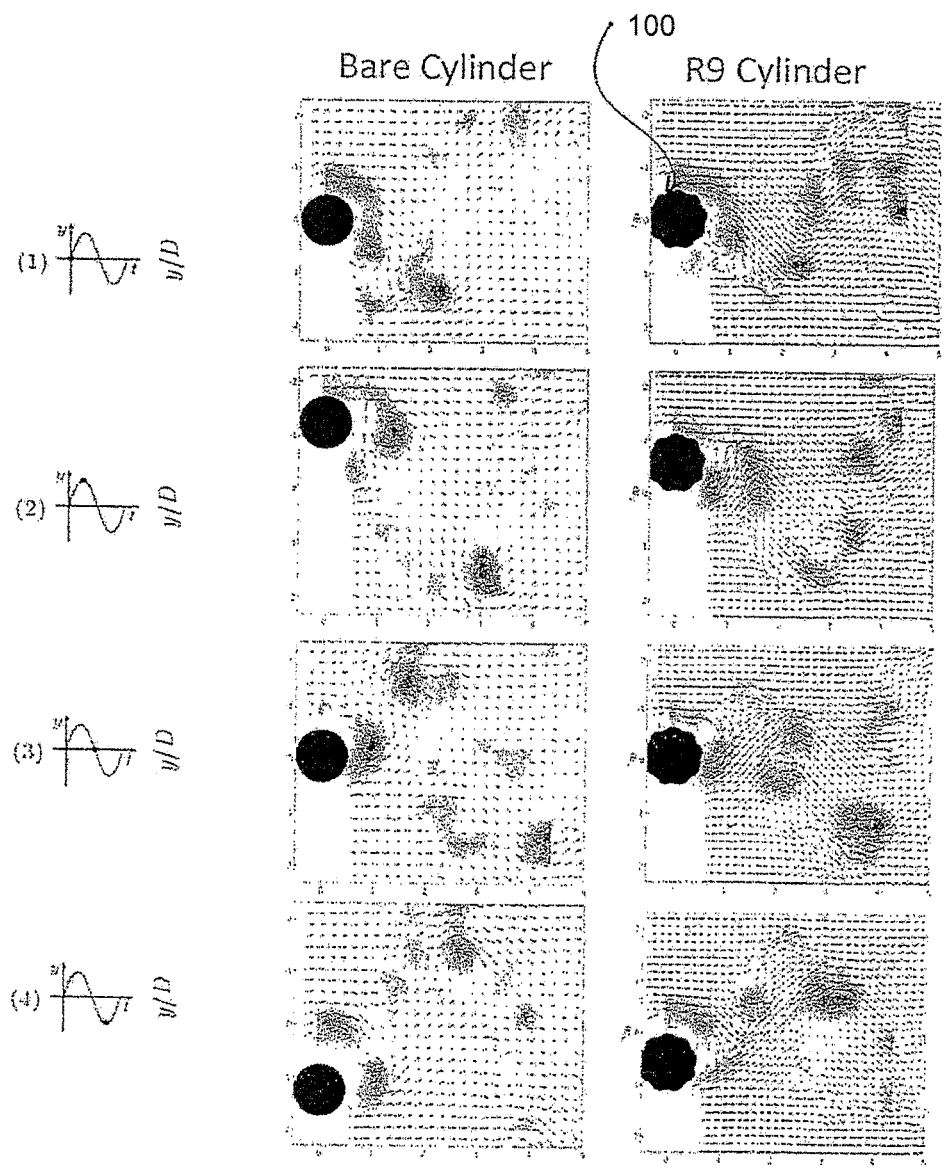
FIG. 9 is a plot of the vorticity wake formation of a flow modification device according to an embodiment of the invention having generally curved or rounded ridges.

FIG. 9 details the downstream vorticity wake formation performance of the R9 cylinder as compared to the bare cylinder. Downstream vorticity wake formation is a way of assessing how vortices are shed from a cylinder. As shown in FIG. 9, the flow modification device 10 advantageously sheds an elongated vortex per half cycle rather than a circular vortex per half cycle, which results in a reduced peak loading. By reducing the peak loading, the R9 cylinder is subject to less vibration and drag (and therefore less fatigue) as compared to the bare cylinder.

Figure 10:
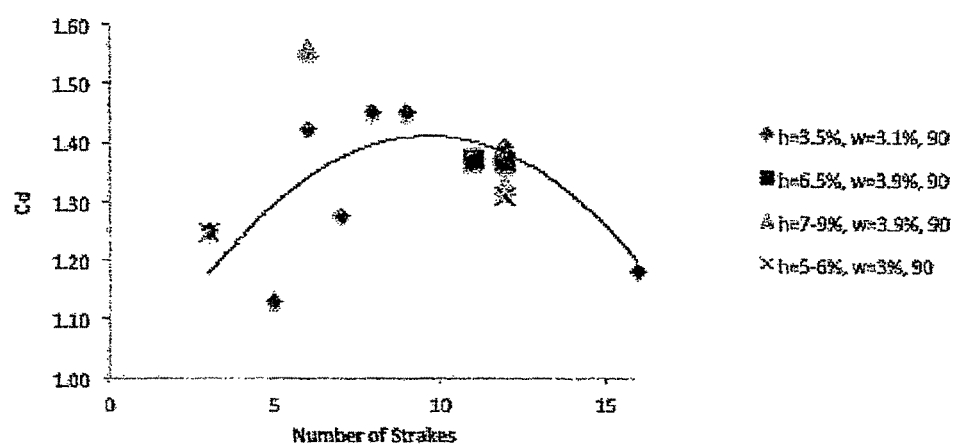
FIG. 10 is a plot of the static drag characteristics of various flow modification devices or cylindrical elements having generally trapezoidal ridges according to embodiments of the invention.

FIG. 10 details the static drag performance of various cylindrical elements 10 incorporating trapezoidal ridges or strakes according to an embodiment of the invention. The static drag is represented by the drag coefficient $C_D$, which is plotted on the y-axis. The number of raised body portions or strakes of various trapezoidal geometries are plotted on the x-axis. As can be seen in FIG. 10, embodiments of the flow modification device 10 or cylindrical element 100 incorporating 3, 5, 12, or higher trapezoidal raised body portions or ridges realise greater static drag benefits over those with raised body portions in the mid-range (6 through 10 trapezoidal raised body portions).

Figure 11:
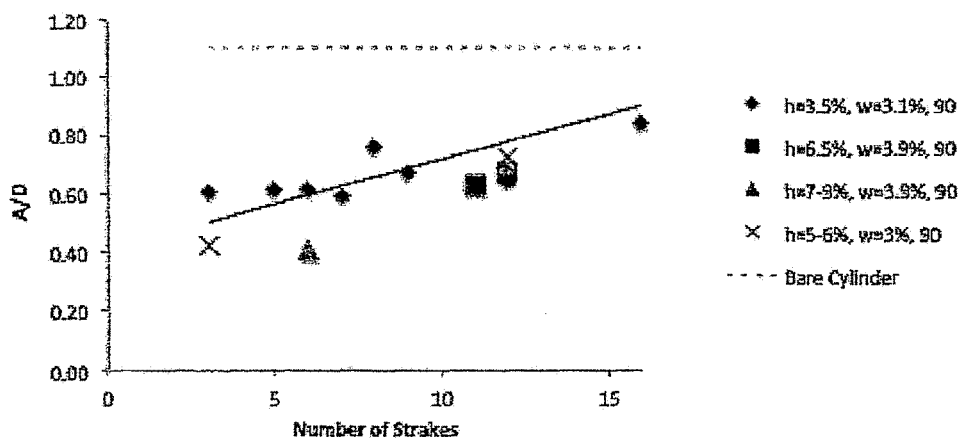
FIG. 11 is a plot of the vibration characteristics of various flow modification devices or cylindrical elements having generally trapezoidal ridges according to embodiments of the invention.

The amplitude of vibration of various cylindrical elements incorporating trapezoidal ridges or strakes according to the invention is plotted in FIG. 11. The amplitude of vibration is represented on the y-axis by the non-dimensional quantity A/D and is the mean of the maximum amplitude of vibration for a series of steady state tests. As can be seen in FIG. 11, a cylindrical element incorporating fewer trapezoidal ridges 14 exhibited the lowest amplitude of vibration compared to the other tested cylindrical elements. In every case, the flow modification device 10 or cylindrical element 100 exhibited a lower amplitude of vibration as compared to a bare cylinder.

Figure 12:
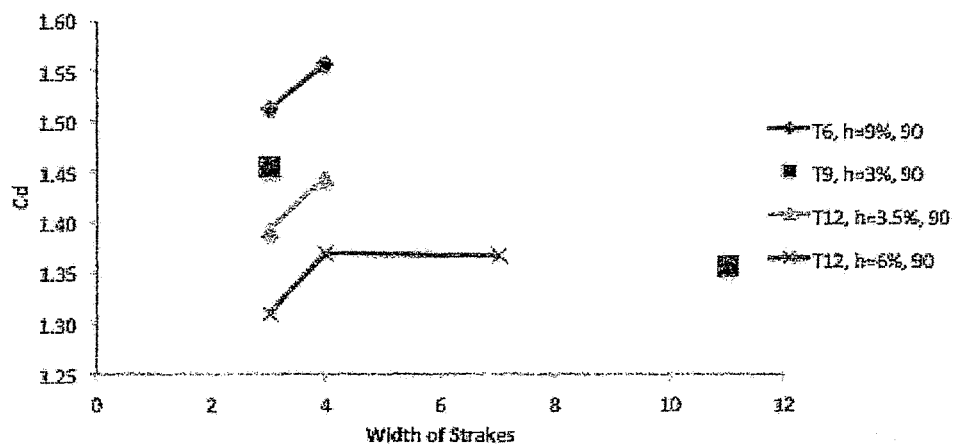
FIG. 12 is a plot of the static drag characteristics of various flow modification devices or cylindrical elements having generally trapezoidal ridges.

FIG. 12 details the static drag performance of various cylindrical elements 10 incorporating trapezoidal ridges against the width of the trapezoidal ridges. As can be seen from FIG. 12, a preferred embodiment of the flow modification device 10 has a width around 3% of the outside diameter, which yields the lowest static drag coefficient of the results plotted in FIG. 12.

Figure 13:
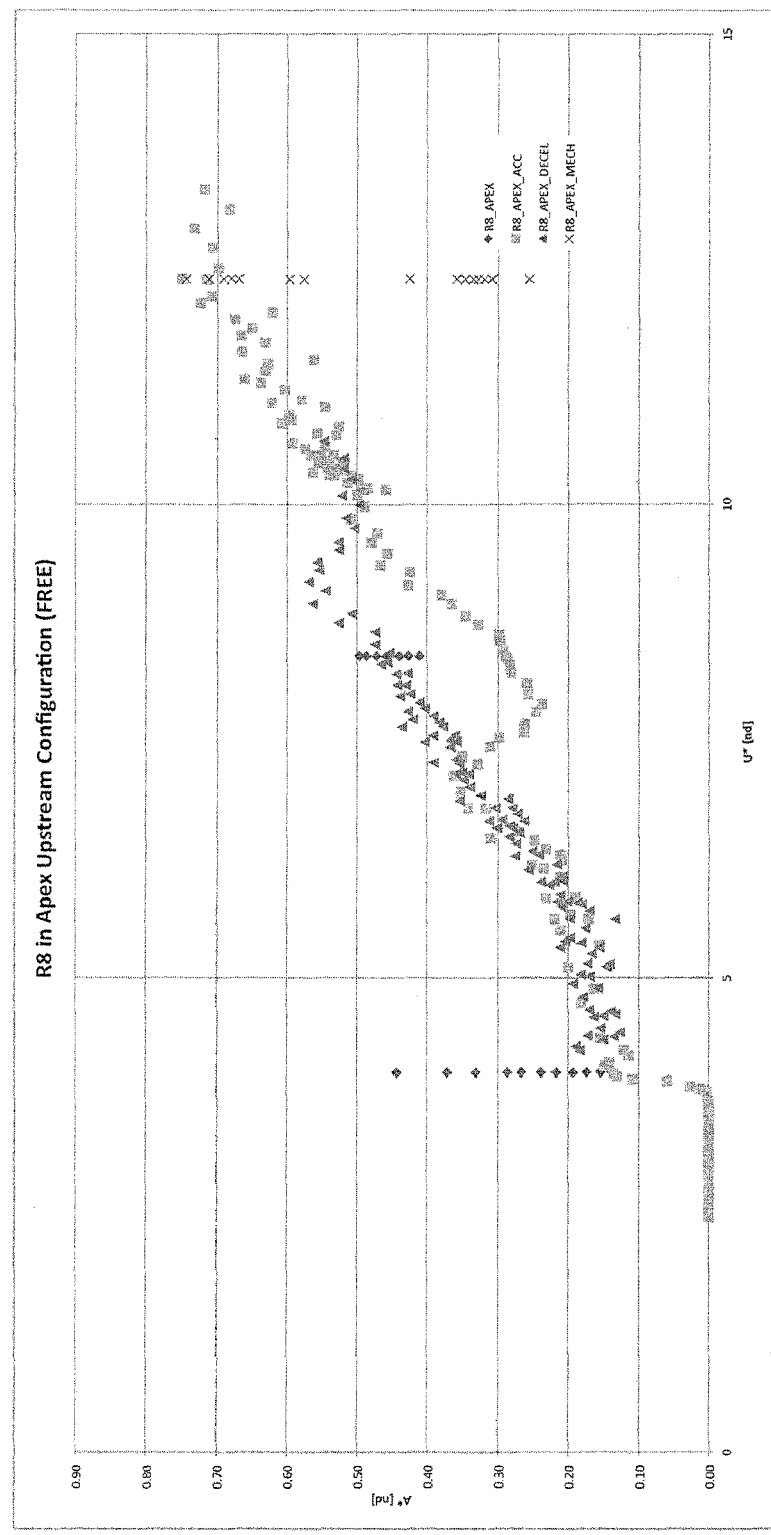
FIG. 13 is a plot of the vibration characteristics of various flow modification devices or cylindrical elements having generally continuous curved or rounded ridges.
Figure 14:
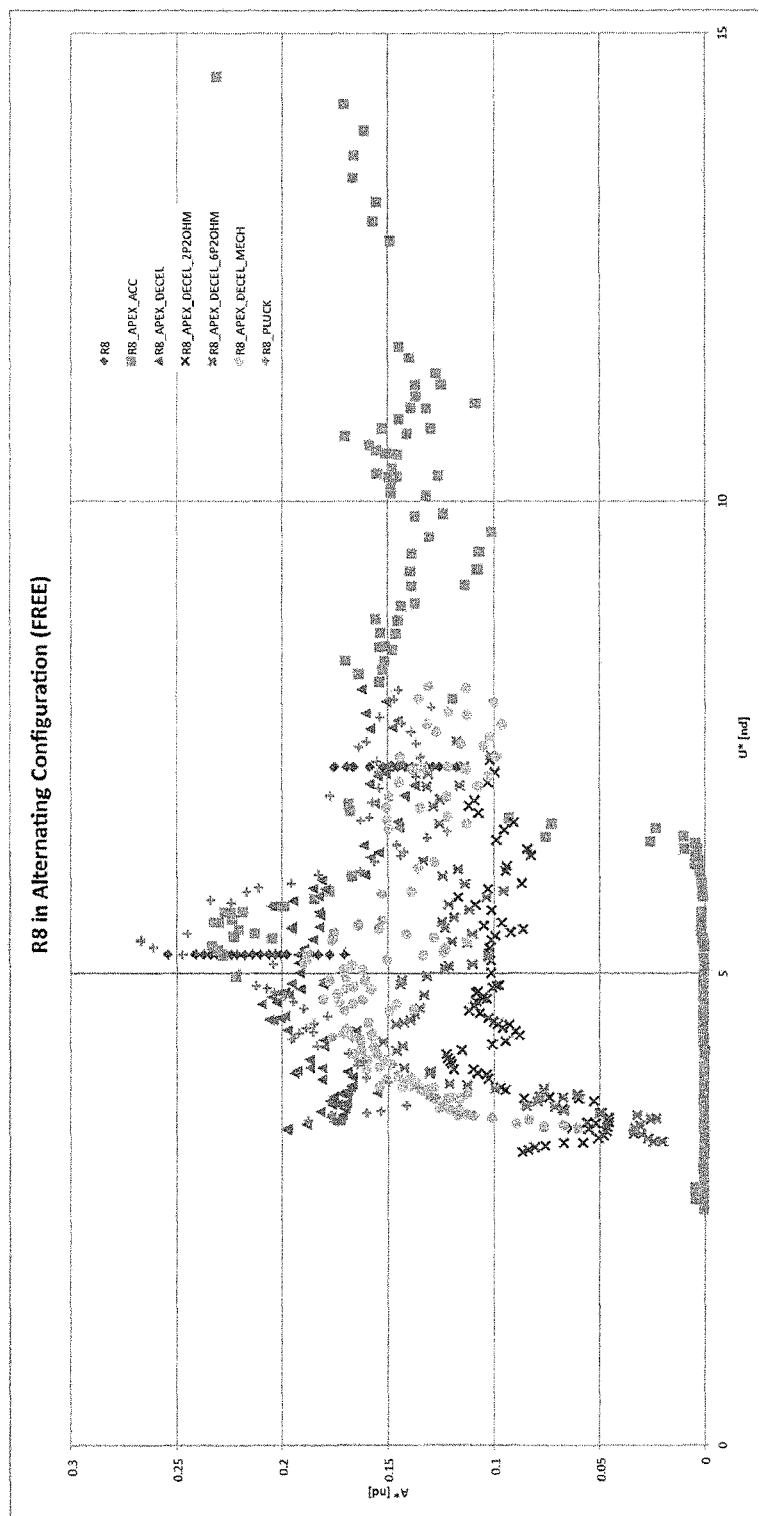
FIG. 14 is similar to FIG. 13, but shows the vibration characteristics of various flow modification devices or cylindrical elements having longitudinally offset, or alternating, curved or rounded ridges.

FIGS. 13 and 14 compare the vibration characteristics of a freely vibrating R8 cylindrical element 100 having a first plurality of continuous (or aligned) curved or rounded ridges disposed along its length (FIG. 13) to a similar freely vibrating R8 cylindrical element having at least a first plurality of curved or rounded ridges that are longitudinally off-set from a second adjacent plurality of curved or rounded ridges (FIG. 14). In particular, the R8 cylindrical element of FIG. 14 includes four alternating or longitudinally off-set sections of curved or rounded ridges, with the curved or rounded ridges of a first section or length being aligned with the grooved body portions of a second adjacent section or length. The R8 cylindrical element of FIGS. 13 and 14 has a length to diameter ratio of approximately 17, and the data shown was generated at a high Reynolds number. As can be seen from comparing FIGS. 13 and 14, the dimensionless amplitude of vibration (A*) of the R8 cylindrical element with continuous or aligned ridges peaks at approximately 0.7 (FIG. 13), whereas the amplitude of vibration (A*) of the R8 cylindrical element with alternating or longitudinally off-set sections of ridges peaks at a much lower value of approximately 0.26 (FIG. 14).

Accordingly, a cylindrical element 100 incorporating sets or groups of longitudinally off-set or non-aligned raised body portions results in a lower dynamic vibration response (and therefore lower drag and dynamic fatigue), and is therefore preferred to a cylindrical element incorporating raised body portions that are continuously aligned along its length. Similarly, when arranging or installing a plurality of flow modification devices according to the invention about a generally cylindrical element, the data of FIGS. 13 and 14 indicates that it is preferable that the plurality of raised body portions of a first flow modification device are not aligned with the plurality of raised body portions of a second adjacent flow modification device. In other words, it is preferable that the second flow modification device is longitudinally off-set or rotated about the longitudinal axis with respect to the first flow modification device by a rotation angle, which rotation angle may be approximately half the angle between adjacent raised body portions of the first flow modification device (as measured from centrelines of adjacent raised body portions).

The flow modification device 10 or cylindrical element 100 of the present disclosure can be utilised or incorporated into a variety of structures as detailed below.

Figure 15:
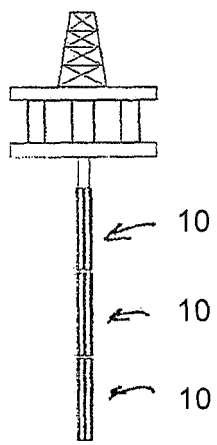
FIG. 15 is a schematic representation of an application of a flow modification device or cylindrical element according to an embodiment of the invention.

FIG. 15 shows an application in which the present flow modification device 10 or cylindrical element 100 may be utilised. In FIG. 15, the flow modification device 10 or cylindrical element 100 is shown as an integral part of an external surface of buoyancy units which are typically required on deep water drilling risers to aid in suspending the weight of the riser.

Figure 16:
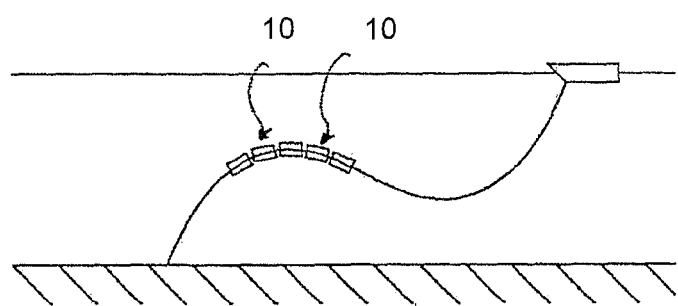
FIG. 16 is a schematic representation of a further application of a flow modification device or cylindrical element according to an embodiment of the invention.

FIG. 16 shows a further application in which the present flow modification device 10 or cylindrical element 100 may be utilised. In FIG. 16, the flow modification device 10 or cylindrical element 100 is shown as an integral part of an external surface of discrete buoyancy units which are utilised to create a compliant wave shape in the depicted steel lazy wave riser or flexible lazy wave riser. By utilising the described flow modification device 10, VIV suppression advantages may result thereby offering enhanced fatigue performance of the underlying structural riser when compared to standard circular cross-section buoyancy units. Drag reduction advantages may also be realised when compared to standard circular cross-section buoyancy units.

Figure 17:
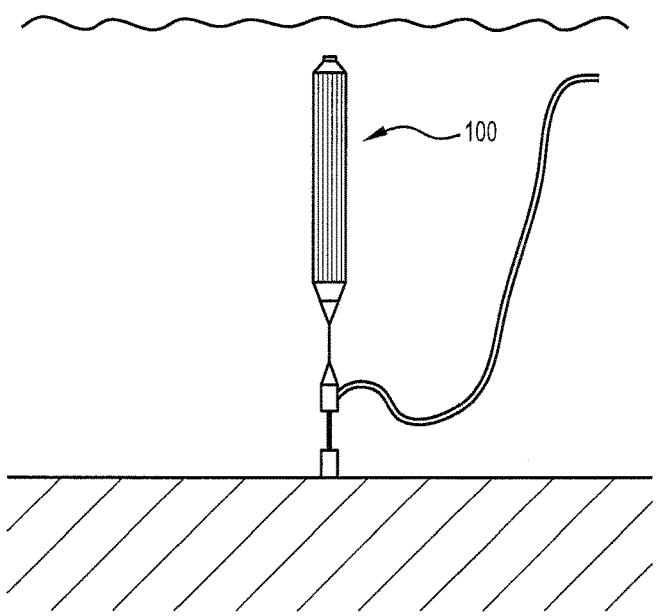
FIG. 17 is a schematic representation of a further application of a flow modification device or cylindrical element according to an embodiment of the invention.

FIG. 17 shows a further application in which the present flow modification device 10 or cylindrical element 100 may be utilised. In FIG. 17, the flow modification device 10 or cylindrical element 100 is shown as an integral part of an external surface of a single discrete large buoyancy unit which provides vertical uplift to an underlying subsea riser structure. Such large buoyancy units are typically subjected to vortex-induced motion effects which can lead to greater problematic drag forces and greater fatigue on the connections and underlying structure. In FIG. 17, the present flow modification device or cylindrical element is shown on the external surface of the buoyancy unit with the longitudinal raised body portions or ridges 14 shown vertically. Alternatively, if the buoyancy unit has a primary axis configured horizontally, then the ridges 14 may be positioned horizontally (i.e., generally parallel to the seabed).

Figure 18:
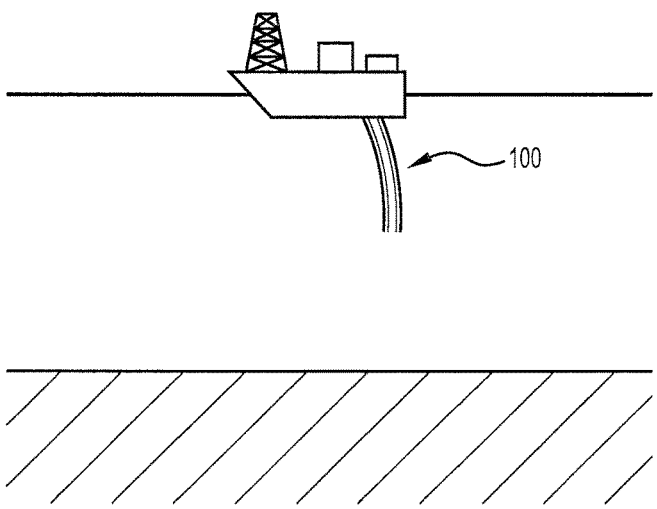
FIG. 18 is a schematic representation of a further application of a flow modification device or cylindrical element according to an embodiment of the invention.

FIG. 18 shows a further application in which the present flow modification device 10 or cylindrical element 100 may be utilised. In FIG. 18, the flow modification device 10 or cylindrical element 100 is shown as an integral part of an external surface of a flexible free-hanging hose. By utilising the described flow modification device 10, VIV suppression and drag advantages may result thereby offering enhanced fatigue performance and drag reduction of the underlying metallic components in the structural hose or riser when compared to standard circular cross-section hoses.

Figure 19:
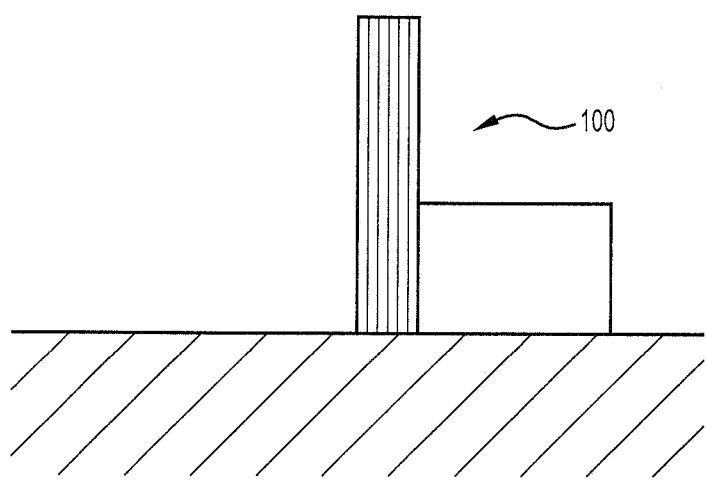
FIG. 19 is a schematic representation of a further application of a flow modification device or cylindrical element according to an embodiment of the invention.

FIG. 19 shows a further application in which the present flow modification device 10 or cylindrical element 100 may be utilised. In FIG. 19, the flow modification device 10 or cylindrical element 100 is shown as an integral part of an external surface of a chimney stack in air. The present flow modification device 10 offers manufacturing advantages over existing technologies, such as helical strakes, as the flow modification device 10 can be formed into the process of manufacturing the base chimney. Manufacturing of the base chimney may be done via a rolled and welded process or via a continuous concrete pour, whereas helical strakes are required to be fitted after the manufacturing of the base chimney.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A flow modification device connectable to a generally cylindrical element adapted for immersion in a fluid medium, the device comprising:
   an elongate body having a length and a generally circular cross-section;
   a plurality of raised body portions disposed about and extending along the length of the elongate body, the raised body portions being arranged generally parallel to a longitudinal axis of the body and having a height between 2% and 10% of a diameter of the body; and
   an aperture extending through the length of the elongate body, the aperture being adapted to receive the generally cylindrical element such that the flow modification device is arranged about the cylindrical element;
   wherein the plurality of raised body portions are generally curved or rounded ridges which define respective curved grooved body portions therebetween, to provide a succession of raised and grooved body portions that present a continuous smooth surface geometry;
   wherein the plurality of raised body portions are adapted to reduce vortex-induced vibration and/or drag on the cylindrical element when the device is connected to the cylindrical element and the connected device and cylindrical element are immersed in the fluid medium and there is relative movement between the connected device and cylindrical element and the fluid medium.

2. The flow modification device of claim 1, wherein the plurality of raised body portions includes a first plurality of raised body portions disposed along a first length of the elongate body and a second plurality of raised body portions disposed along an adjacent second length of the elongate body, and wherein the second plurality of raised body portions are off-set about the longitudinal axis with respect to the first plurality of raised body portions such that the second plurality of raised body portions are not aligned with the first plurality of raised body portions.

3. The flow modification device of claim 1, wherein the generally curved or rounded ridges have a height between 2% and 7.5% of the diameter of the body.

4. The flow modification device of claim 3, wherein the elongate body includes between 4 and 12 curved or rounded ridges disposed equidistant about the elongate body.

5. The flow modification device of claim 4, wherein the elongate body includes between 5 and 9 curved or rounded ridges disposed equidistant about the elongate body.

6. The flow modification device of claim 4, wherein each of the curved or rounded ridges have radii between 2% and 38% of the diameter of the body.

7. The flow modification device of claim 1, wherein each the respective grooved body portions have radii between 0.75% and 78% of the diameter of the body.

8. A flow modification system for the reduction of vortex-induced vibration and/or drag on a generally cylindrical element immersed in a fluid medium, the system comprising:
 a plurality of flow modification devices according to claim 1, wherein each flow modification device is arranged about and extends along the cylindrical element; and
 a means for releasably securing each of the plurality of flow modification devices about the cylindrical element.

9. The flow modification system of claim 8, wherein the plurality of raised body portions of a first flow modification device are aligned with the immediately adjacent plurality of raised body portions of a second adjacent flow modification device.

10. The flow modification system of claim 8, wherein the plurality of raised body portions of a first flow modification device are not aligned with the immediately adjacent plurality of raised body portions of a second adjacent flow modification device.

11. A method for reducing vortex-induced vibration and/or drag on a generally cylindrical element immersed in a fluid medium, the method comprising the steps of:
 arranging a plurality of flow modification devices according to claim 1 about the cylindrical element; and
 releasably securing each of the plurality of flow modification devices to the cylindrical element.

\* \* \* \* \*